Jan. 3, 1961   F. B. HEICHEL   2,966,863
SAFETY COUPLER

Filed Dec. 16, 1958   3 Sheets-Sheet 1

INVENTOR.
FLOYD B. HEICHEL
BY Wade Koontz
Charles D. Wagner
ATTORNEYS

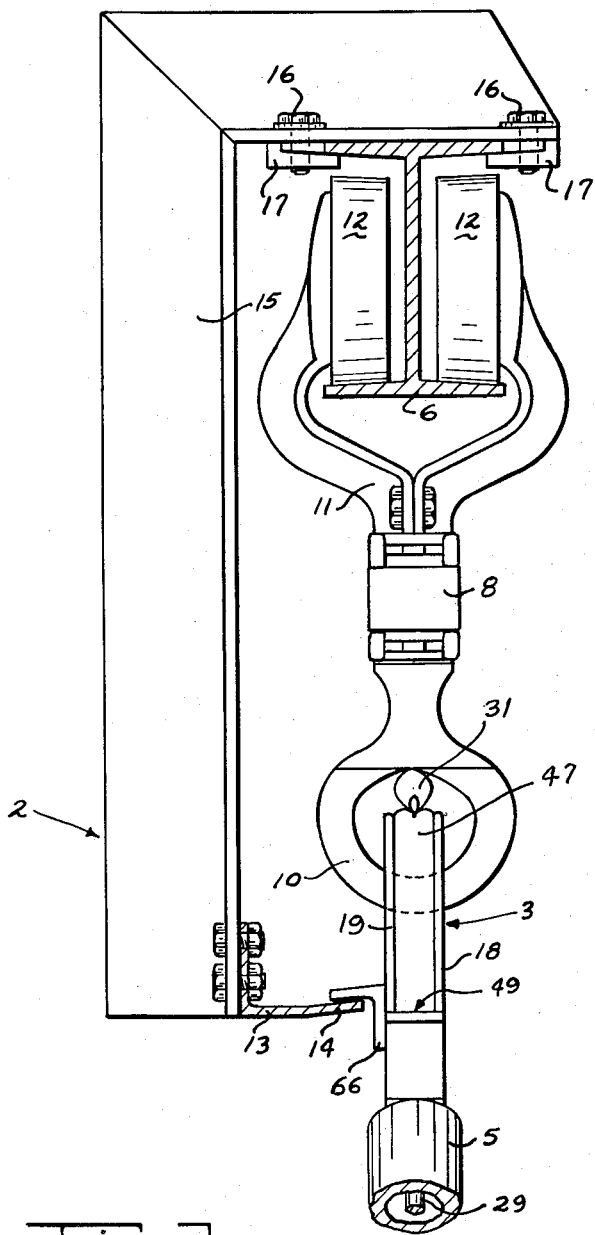

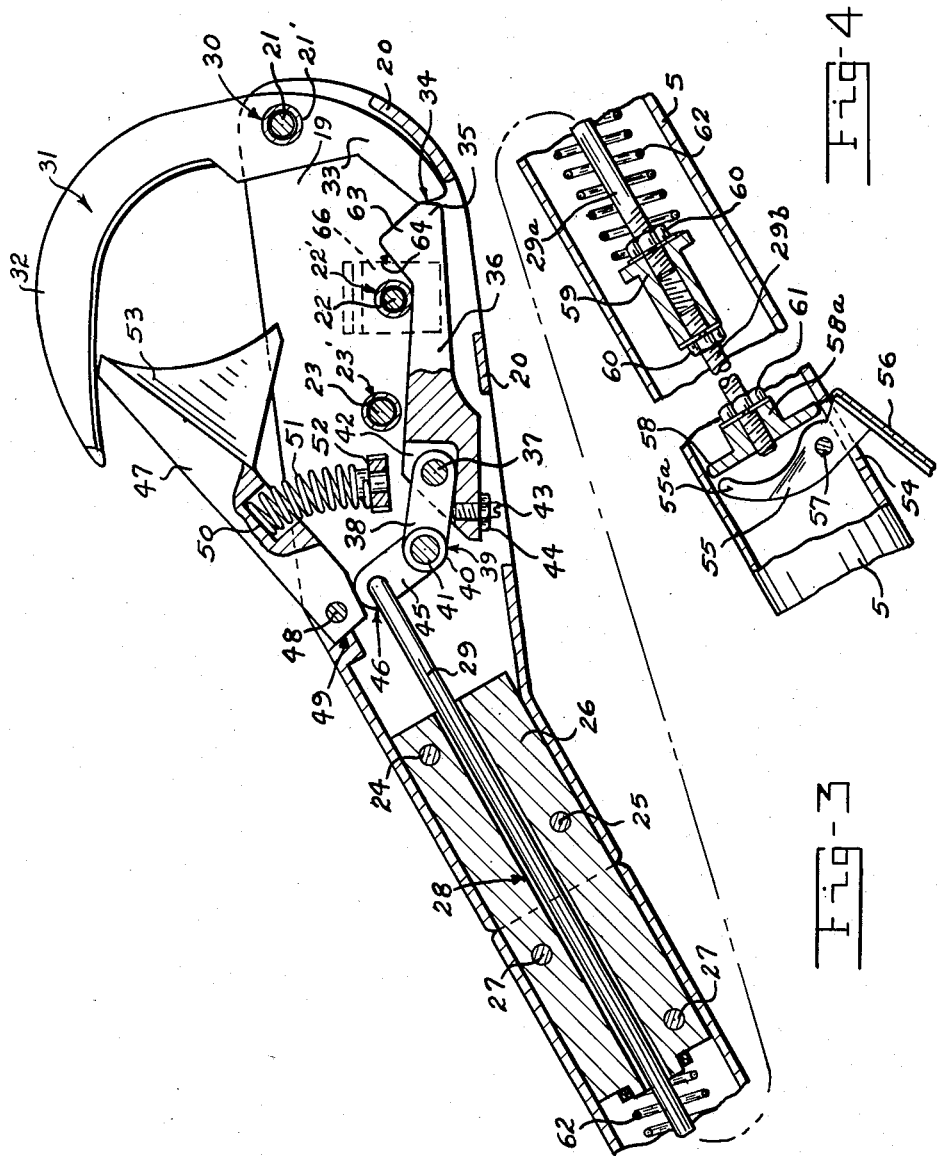

United States Patent Office 2,966,863
Patented Jan. 3, 1961

2,966,863
SAFETY COUPLER

Floyd B. Heichel, 335 Highland Blvd., San Antonio, Tex.

Filed Dec. 16, 1958, Ser. No. 780,907

11 Claims. (Cl. 104—170)

(Granted under Title 35, U.S. Code (1952), sec. 266)

The invention described herein may be manufactured and used by or for the United States Government for governmental purposes without payment to me of any royalty thereon.

This invention relates to safety coupler devices and more particularly comprises; a mechanical safety coupler device designed to form a positive connector between two objects, one object being any type of powered equipment used in transferring, lifting or moving the other object, the coupler device forming the essential part of the invention. More particularly the invention primarily relates to a coupling device which may be manually and automatically coupled to a power driven conveyor or movement conveying means and which is manually releasable from the conveying device at any time, automatically releasable from the power conveying means upon engagement of an obstacle in the path of movement of the device and upon a predetermined overload between the device or article being moved and the power driven conveyor means.

An object of the invention is the provision of a safety coupling device which is adapted for connection with a power driven moving means such as an overhead power driven conveyor means, including a quick release means for disengaging the coupling device from the conveyor means.

A further object includes means for disengaging the coupling device from the conveyor means upon engagement of the device with an obstacle in the path of its movement.

A still further object includes means for causing disengagement from the conveyor upon a predetermined overload between the conveyor means and the load coupled to the coupling device and being advanced thereby.

Another object comprises means for adjusting the overload release means for varying the amount of overload tension necessary to cause the overload release action.

A further object is the combination of a safety coupling device and a power driven overhead conveyor means having a load pickup station in the length thereof and automatic cooperating means between the conveyor means and the coupling means whereby the coupling device is automatically connected to the conveyor means at said station.

A further object is the provision of a quick release overhead trolley conveyor hook coupling device for use with a power driven overhead trolley type conveyor for automatically connecting tow trucks, skids, etc. to the conveyor for towing the same from place to place in which a towing tongue is provided having a releasable hook at its upper end for pickup connection with a load connecting ring on the trolley and release means on the towing mast or tongue for completely releasing the hook from the ring.

A further object includes positioning the release means on the advancing side of the towing tongue where it can be actuated by any obstruction in the path of advance movement of the tongue to automatically disengage the tongue hook from the conveyor ring when the tow tongue or mast strikes an obstruction, and also upon manual actuation of the release means.

A further object is the provision of release means arranged for manually releasing the towing mast from the power conveyor under full towing load, and automatically upon a predetermined overload tension between the towing mast and the power conveyor hook.

A further object is the provision of a positive coupling device which is quickly and positively releasable without requiring forward movement of the draft member or towing mast or tongue, relative to its point of connection with the conveyor.

Other objects and advantages of the invention will become apparent from the following description and accompanying drawings in which like reference characters refer to like parts.

In the drawings—

Fig. 2 is an end elevation of the improved coupling device taken in a plane at right angles to Fig. 1, and on a larger scale than in Fig. 1;

Figure 1:
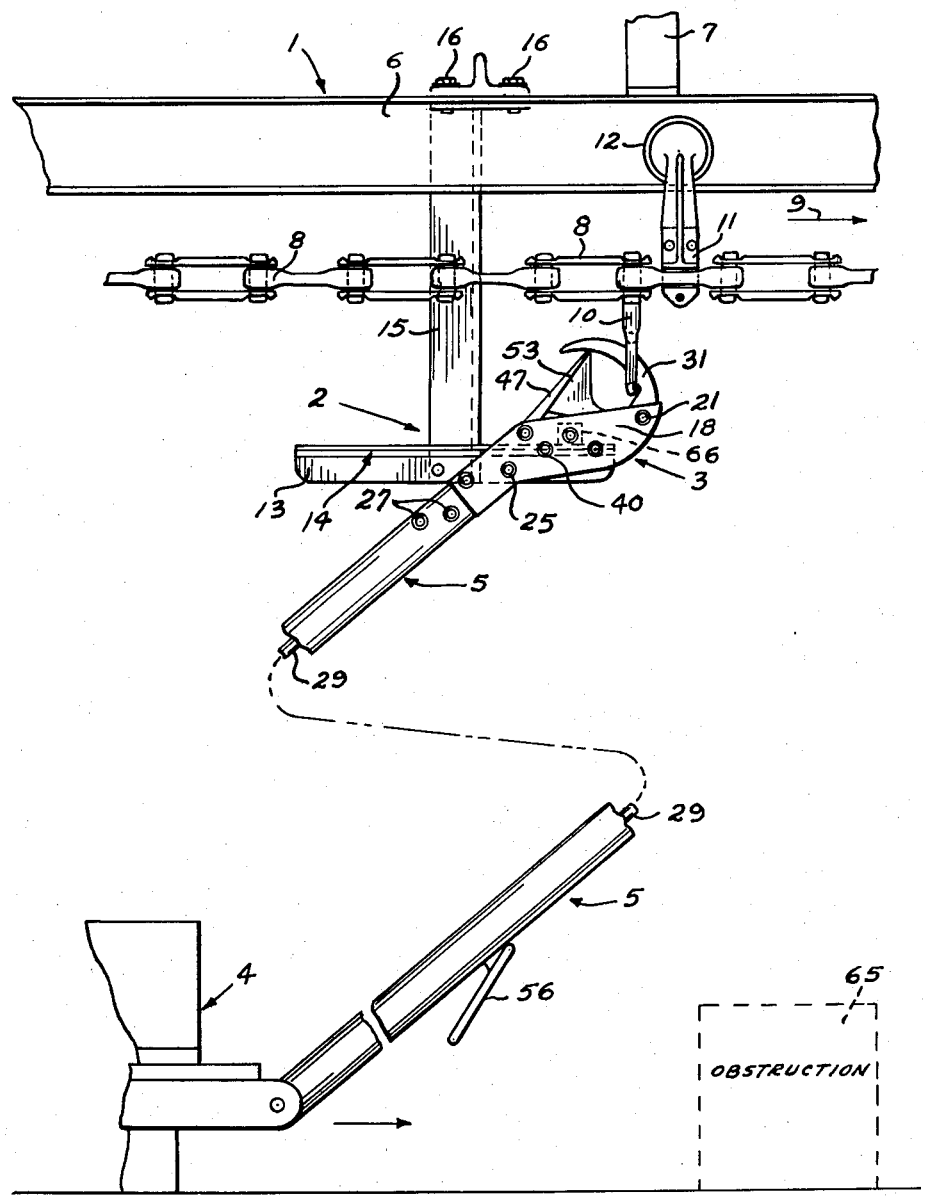
Fig. 1 is a somewhat schematic side elevation of the invention on a small scale showing the same in cooperative coupling relation to a towing ring of an overhead trolley and chain conveyor.

Fig. 3 is an enlarged longitudinal sectional view of the improved automatic overload release coupling device showing the internal cooperating parts in elevation, certain portions thereof being broken away and shown in section for clearness; and Fig. 4 is a continuation of Fig. 3, in section, showing the towing mast or tongue handle portion and the manual and obstruction release trigger means, parts being broken away to foreshorten the view.

Referring to Fig. 1, the reference numeral 1 indicates an overhead chain and trolley power conveyor generally while numeral 2 indicates one of the load pickup stations disposed at predetermined points in the conveyor length, the automatic coupling overload release device being denoted generally at 3, and connected to a load carrier 4 by a towing tongue or mast 5.

The power conveyor 1 is generally conventional, somewhat similar to that shown in the patent to McCormick, No. 2,644,407, and comprises a track or rail 6, preferably of I beam section and is supported in an overhead manner as by supporting brackets 7. A conveyor chain 8 is power driven in the direction of the arrow 9 and is provided with spaced load pickup rings or loops 10. The chain 8 is supported by depending brackets 11 carried by rollers 12 which roll in the channels of the I beam track 6.

The pickup stations 2 each comprises an elongated supporting angle iron 13 as seen in Fig. 2 having a slightly upturned outer edge 14 disposed parallel to the direction of travel of the conveyor chain 8.

The angle irons 13 are preferably supported intermediate their longitudinal ends on the lower extremities of angle frames 15 extending over the top surface of the I beam channel 6, being secured thereto by the bolts 16 and clips 17 or cleats.

Referring to Figs. 3 and 4 the releasable coupling member 3 comprises a pair of spaced parallel side plates 18, 19 connected in spaced relation by spacer webs 20 and secured together by bolts or screw fasteners 21, 22, 23, 24 and 25, the fasteners 21, 22 and 23 extending through the spacer sleeves 21', 22', 23' respectively, while an elongated guide block 26 between the plates projects beyond the lower ends of the side plates to receive the upper end of the towing tongue or mast 5, the same fitting the block 26 and secured to the block 26 by bolts or rivets 27. The block 26 has a longitudinal bore 28 extending therethrough to accommodate a latch release rod indicated generally at 29.

The sleeve 21' comprises pivot means 30 for a pivoted pickup hook member 31 having a curved or hook end 32 at one side of the pivot and a latching arm extension 33 thereon between the plates 19 and 20 terminating in an abutment shoulder 34 disposed for impinging engagement with the end 35 of a locking-release pawl 36 which is pivotally connected at one end at 37 to one arm 38 of a pivoted bell crank lever 39 pivoted at 40 on a cross pin 41 extending through the opposite sides of the plates 18 and 19, as shown in the drawings.

The locking-release lever or pawl 36 is provided with a slot or recess 42 to accommodate the arm 38. An adjustable stop pin or screw means 43 and jam nut 44 are provided for adjusting the thrust line through the pawl and bell crank between the abutting surface 34 and the bell crank pivot 40.

The stop pin or set screw 43 is threaded through the wall of the bottom of the recess 42 in the release pawl 36 and engages the edge of the arm 38 of the bell crank between the pivots 40 and 37, screw 43 being provided with a slot at its outer end for receiving an adjusting means for axial adjustment of the pin 43 in the pawl 36.

The other arm 45 of the bell crank is pivoted at its end to the upper end 46 of the latch release rod 29.

A hook closure lever or keeper 47 is provided for closing the entrance to the hook 31 upon hookup engagement of the hook with one of the pickup rings, the keeper 47 being pivoted intermediate the side plates at 48 and having shoulder means 49 for limiting outward swinging of the latch when the hook member 31 is released.

The keeper 47 is recessed at 50 to receive one end of a compression spring 51, the other end of the spring 51 being seated on projection 52 extending inwardly from one of the side plates 18, 19.

The keeper 47 is also provided with an inwardly projecting tongue 53 to prevent the ring on the conveyor chain from moving behind the keeper.

As seen in Fig. 1 the load 4 is connected to the lower end of the towing mast or tongue 5. This load may be a cart or wheeled carrier or a skid platform. The forward or advancing side of the towing mast at a desired convenient elevation above the bottom of the load is slotted as indicated at 54 in Fig. 4 to receive an arm 55 of a release trigger member 56, the arm 55 being pivoted at 57 on a pin extending through the towing mast, the mast being hollow and preferably cylindrical in cross section.

The inner extremity 55ª of the trigger 5 engages a plate or disk 58 carried at the lower extremity of the release rod 29.

The release rod 29 actually is made in two or more pieces, the upper piece or section 29ª being threaded at its lower end into a flanged threaded coupling member 59 and secured by a jam nut 60 while the lower piece or section 29ᵇ is threaded at its upper end into the coupling member 59 and secured by jam nut 60 while the lower end of the section 29ᵇ is threaded into the hub 58ª of the disk 58 and secured by jam nut 61.

A compression coil spring 62 surrounds the rod 29ª and is interposed under compression between the lower end of the block 26 and upper surface of flanged coupling 59. This maintains a predetermined downward tension or pull on the arm 45 of the bell crank lever 39.

The outer extremity of the manual and automatic release latch member or pawl 36 is formed with a somewhat triangular shaped camming lug 63 having a camming surface 64 facing toward the hook and keeper members 31 and 47 and disposed for camming engagement with the spacer sleeve 22' to move the outer or abutment end 35 of the pawl 36 outwardly and downwardly out of impinging engagement with the shoulder 34 on the hook either by reason of the movement of the hook clockwise around the pivot 30, as shown in Fig. 3, upon a predetermined overload on the hook 31 as determined by the adjustment of the offset alignment of the pivot 39 relative to the direction of thrust on the outer end of the pawl by the hook extremity 34 and the adjusted tension of the spring 62, or by reason of depression of the trigger 56 manually on purpose, or by engagement of an obstruction such as 65 in the path of movement of the towing mast 5.

At least one of the plates 18 and 19 has a lateral supporting projection 66 in the form of a small angle iron secured to its outer face as seen in Fig. 2 designed to support the upper end of the towing mast and pickup hook in position at the pickup station for engagement of the hook 31 with the towing ring 10 on the conveyor or power towing means. The supporting flange or projection 66 is slightly downturned to engage the up-turned edge 14 of the angle plate to prevent the same from slipping off of the supporting angle iron 13 while the mast head is at the pickup station 2 awaiting engagement of the pickup ring 10 on the power conveyor.

Referring to Fig. 1, it is assumed that the power conveyor chain (or cable) 8 is moving in the direction of the arrow 9.

The cargo or load supporting carrier 4 is moved to a position at the pickup station under or in alignment with the conveyor 9 and the tongue or mast 5 is raised to deposit the supporting flange 66 on the head of the mast on the supporting angle iron 13 at the pickup station 2. This positions the mouth of the hook 32 in receiving alignment with one of the advancing rings on the power conveyor chain 8.

The mast 5 can also be manually brought in position and hooked onto the chain by raising the upper end for engagement of the hook 32 with a ring 10 at any point intermediate the pickup stations. The advancing chain thus tows the carrier for this load until released.

When normal manual release is desired the release trigger arm is depressed. This extends or advances the release latch rod 29 and rocks the bell crank 39 to shift the pivot 37 in a clockwise direction which rocks the lower end of the pawl 36 outwardly and downwardly. As the pawl is pulled downwardly the cam surface 64 at the upper end of the pawl 36 impinges the sleeve 22' and the upper end 35 of the pawl 36 is cammed out of holding engagement with the abutment shoulder 34, thus releasing the hook 33 permitting the same to swing clockwise to free the mast head from the ring on the power conveyor.

If desired a light return spring may be provided to return the hook member counterclockwise to the position shown in Fig. 3 after the hook has disengaged the conveyor ring.

Should there be an obstruction in the path of travel of the carrier, such as shown at 65 in Fig. 1 the trigger arm 56 will be depressed, releasing the load from the conveyor and the carrier will come to rest.

Should an overload condition occur either from an overloaded load carrier, or because of the carrier or mast meeting an obstruction or immovable object which is in the path of advance movement of the trigger arm, the pull on the hook member will increase with a corresponding increase in the thrust at the end of the hook latching extension 33 on the end 35 of the hook retaining pawl tending to move the pawl downwardly against the spring 62 urging the rod 29 upwardly. Depending upon the adjusted slightly "out of alignment" relation of the pivot 37 with the line of thrust between the abutment shoulder 34 and the bell crank pivot 40, tending to collapse the somewhat toggle action of the parts, the pawl will be shifted downwardly causing the camming surface 64 on the camming lug 63 to displace the upper end of the pawl outwardly for disengagement with the abutment shoulder 34 of the hook latching extension automatically and fully releasing the hook 32, permitting the hook to swing clockwise as seen in the drawing and disengage the ring or eye 10 on the power conveyor 8.

Upon release the hook 32 can be restrained to its locked position by rotating around its pivot, the spring action 62 on the rod 29 now rotating the bell crank 39 in a counterclockwise direction to elevate the pawl 36 and dispose the camming lug 63 above the camming sleeve while the arm 38 of the bell crank impinges the end of the adjustable stop pin 43 in the recess 42 rotating the outer end of the pawl 36 again into locking engagement with the abutment shoulder 34 on the hook latching extension 33 of the main hook 32.

For purposes of exemplification, a particular embodiment of the invention has been shown and described to the best understanding thereof. However, it will be apparent that slight changes and modifications in the arrangement and construction of the parts may be resorted to without departing from the true spirit and scope of the invention as defined in the accompanying claims.

I claim:

1. In combination, a power conveyor having load pickup means adapted to advance in a substantially straight direction, a pickup station disposed in fixed spaced relation to said load pickup means, a pickup hook device adapted to be connected to a load, a support fixed at said pickup station for supporting said pickup hook device in position at said pickup station to be engaged and picked up by said load pickup means for connecting a load to said load pickup means.

2. Apparatus as claimed in claim 1, including automatic release means carried by said pickup hook device for automatically releasing said pickup hook device from said load pickup means upon predetermined overload tension between said pickup hook device and said load pickup means during actuation of said power conveyor.

3. Apparatus as claimed in claim 2, including a combined manually and obstruction operated means connected to said pickup hook device for actuation of said release means by an obstruction disposed in the path of movement of said pickup hook device when said pickup hook device is connected to said load pickup means when said power conveyor is in operation.

4. Apparatus as claimed in claim 3 in which said pickup hook device includes a towing mast extending therefrom, a load carrier connected to said touring mast adapted to support and convey a load from place to place in a path substantially parallel to and in the direction of movement of said power conveyor, said pickup hook device including a supporting element fixed thereon disposed to be positioned in supporting engagement with said fixed support when said pickup hook device is at said pickup station to dispose said pickup hook device in position to be engaged and advanced by said load pickup means.

5. A safety overload release pickup hook device for a power operated conveyor system having a pickup station in the length thereof, comprising a body having spaced parallel side plates, a hollow towing mast extending from one end of said body and adapted to be connected at its outer end to a load carrier for supporting and advancing a load from one station to another station, a load pickup hook member pivoted to said body between said side plates for engaging a pickup loop on the power driven conveyor, a latching pawl disposed in said body for holding engagement with said hook member, a bell crank lever pivoted in said body having one arm thereof pivoted to one end of said pawl for swinging said one end of said pawl outwardly and downwardly from a position where the line of thrust between said hook member on the other end of said pawl, the pivotal center of the bell crank and the pivot between the pawl and the arm of the bell crank being almost but not quite in alignment, spring means operatively connected to the other arm of the bell crank yieldably urging said bell crank to rotate said pivotal connection between said pawl and said arm of said bell crank in a direction toward alignment with the pivotal center of said bell crank and the hook member engaging end of said pawl, adjustable stop means between said pawl and the bell crank arm which is connected to said pawl for limiting the degree of movement of the pivot between the bell crank arm and said pawl into the thrust line between pivotal center of the bell crank member and the hook engaging end of the pawl, and cam means on the hook member engaging end of said pawl for camming the hook engaging end of said pawl outwardly to release said hook member when said pawl is moved downwardly, either by overload thrust on said hook member in a hook opening direction or by rotation of said bell crank to move said bell crank and pawl pivot out of the line of thrust between the bell crank pivot and the point of thrust engagement of the pawl and the hook member.

6. In an overload and manual release hook device for an overhead power conveyor having a loading station, comprising a conveyor chain having pickup loops thereon for connection with a load to advance the same in the direction of movement of the conveyor chain, a towing mast adapted to be connected at its lower end to a load carrier for supporting a load, a towing head fixed to the upper end of said mast comprising spaced side plates, a towing hook pivoted between said side plates having a hook opening facing in a direction opposite to the direction of travel of said pickup loops, support means fixed to said head for supporting the head at said pickup station at a predetermined position for engagement of one of said pickup loops with said towing hook, overload release means in said towing head yieldably engaging said hook to prevent rotation of said hook about its pivot and for releasing said hook upon a predetermined overload pull between said hook and said pickup ring during operation of said conveyor, and obstruction and manually operable trigger means disposed in the forward advancing side of the mast and connected to said overload release means for engagement with an obstruction in the path of advance movement of the mast for actuating said overload release means to release said hook from said pickup loop to stop the advance movement of said load carrier without stopping the operation of said conveyor.

7. A releasable hook device comprising a body, a hook member pivoted in said body, said hook member having a latch holding extension thereon at the opposite side of the pivot, a bell crank lever pivoted in said body in spaced relation to the hook member pivot, having a first arm extending in a direction toward the outer end of said extension, a hook latching pawl pivoted at one end to said first arm slightly offset out of a thrust line between said outer end and the pivot for said bell crank lever, said bell crank having a second arm disposed on the side of the bell crank pivots in materially offset relation at the opposite side of said line direction, spring means connected to said second arm for yieldably holding said bell crank lever with said pawl lever pivot tensioned toward said thrust line, and cam means adjacent the outer end of said pawl member and said body for rocking the outer end of said pawl member outwardly about its pivot on said first arm of said bell crank to disengage said outer end from said hook extension to free said hook member for pivoting about said hook member pivot when said pawl member is moved downwardly toward said bell crank lever pivot either by a predetermined overload on said hook member tending to rock the same about the hook member pivot or positively compressing said spring means and rotating said bell crank second arm upwardly toward said hook member.

8. A hook device as claimed in claim 7 including a keeper member pivoted to said body for yieldable engagement with the inner surface of the hook member and spring means between said keeper member and said body yieldably urging the free end of said keeper member into engagement with the inner surface of said hook member and means between said keeper member and said body for limiting outward swing movement of said keeper when said hook member is released by said locking pawl and swings outwardly around its pivot to a full release position.

9. A hook device as set forth in claim 7 including adjustable stop pin means between the locking pawl and said first arm of the bell crank member for adjustably limiting the degree of movement of the pivot between the pawl and the first arm of the bell crank lever in a direction toward a line of thrust extending between the outer end of the hook member extension and the pivot of said bell crank lever.

10. Apparatus as claimed in claim 9 including a hollow towing mast fixed to said body at one upper end and adapted to be connected to a load supporting carrier at its opposite end, said mast having a forward side when said hook member is connected to a pickup loop in an advancing power conveyor, a hook release trigger member pivoted to said mast and extending in a longitudinal direction relative to said mast away from the mast and depressible toward the mast and means carried by said trigger for positively compressing said spring means and rotating said bell crank about its pivot to disengage said pawl member from said hook extension to release said hook member.

11. Apparatus as claimed in claim 10 wherein said trigger is disposed adjacent the lower end of the towing mast on the advancing front side thereof when the hook member is engaged with a power conveyor in operation whereby an obstruction in the path of advancing movement of the mast which strike and depress said trigger to release said hook member from said conveyor and thereby arrest the movement of a load supporting carrier when connected to said mast.

References Cited in the file of this patent
UNITED STATES PATENTS

| | | |
|---|---|---|
| 1,813,075 | Neufang et al. | July 7, 1931 |
| 2,139,577 | Deaver | Dec. 6, 1938 |
| 2,644,407 | McCormick | July 7, 1953 |
| 2,708,886 | Neely | May 24, 1955 |